(12) United States Patent
Gillingwater et al.

(10) Patent No.: US 8,920,142 B2
(45) Date of Patent: Dec. 30, 2014

(54) WET ROTOR PUMP MOTOR STATOR SEALING LINER

(75) Inventors: Philip Gillingwater, Nashville, TN (US); Aaron M. Finke, Janesville, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 303 days.

(21) Appl. No.: 13/406,898

(22) Filed: Feb. 28, 2012

(65) Prior Publication Data

US 2013/0224048 A1  Aug. 29, 2013

(51) Int. Cl.
*H02K 5/128* (2006.01)

(52) U.S. Cl.
CPC ..................... *H02K 5/128* (2013.01)
USPC ...................... 417/423.14; 310/87; 417/423.7

(58) Field of Classification Search
CPC .......... H02K 5/132; H02K 5/04; F04B 17/00; F04B 17/03
USPC ................................. 417/278, 279
See application file for complete search history.

(56) References Cited

U.S. PATENT DOCUMENTS

| | | | |
|---|---|---|---|
| 4,115,038 A * | 9/1978 | Litzenberg | 417/357 |
| 5,193,991 A * | 3/1993 | Koebler et al. | 417/571 |
| 5,919,033 A | 7/1999 | Singleterry et al. | |
| 6,068,456 A | 5/2000 | Tuckey et al. | |
| 6,146,113 A * | 11/2000 | Fassnacht et al. | 417/367 |
| 6,394,776 B2 | 5/2002 | Boldenow | |
| 6,814,549 B2 | 11/2004 | Kimberlin et al. | |
| 6,884,043 B2 * | 4/2005 | Kimberlin et al. | 417/355 |
| 6,969,940 B2 | 11/2005 | Dalrymple et al. | |
| 7,074,019 B2 * | 7/2006 | Knoll | 417/423.14 |
| 7,348,699 B2 | 3/2008 | Ritzinger et al. | |
| 7,575,421 B2 | 8/2009 | McAuliffe et al. | |
| 7,658,066 B2 * | 2/2010 | Bildstein et al. | 60/476 |
| 7,732,953 B2 | 6/2010 | Telakowski | |
| 7,938,214 B2 | 5/2011 | Telakowski | |
| 8,038,412 B2 | 10/2011 | Durtschi | |
| 2002/0015845 A1 * | 2/2002 | Morita et al. | 428/367 |
| 2002/0195468 A1 * | 12/2002 | White et al. | 222/413 |
| 2003/0077191 A1 * | 4/2003 | Knoll | 417/423.7 |
| 2005/0121987 A1 * | 6/2005 | Ritzinger et al. | 310/68 B |
| 2006/0153713 A1 * | 7/2006 | Dooley | 417/418 |
| 2009/0033160 A1 * | 2/2009 | Mueller | 310/58 |
| 2010/0148605 A1 * | 6/2010 | Moore et al. | 310/86 |
| 2012/0112578 A1 * | 5/2012 | Telakowski et al. | 310/64 |
| 2013/0177405 A1 * | 7/2013 | Legros et al. | 415/173.7 |
| 2013/0278091 A1 * | 10/2013 | Ohashi et al. | 310/58 |

FOREIGN PATENT DOCUMENTS

WO   WO 2010/026159 A1 *   3/2010

* cited by examiner

*Primary Examiner* — Devon Kramer
*Assistant Examiner* — Jon Hoffmann
(74) *Attorney, Agent, or Firm* — Carlson, Gaskey & Olds, PC

(57) ABSTRACT

A sealing liner for use in a pump motor incorporates a radially enlarged portion at one end, and a radially smaller portion extending from the one end to an opposed end. A length of the overall sealing liner including the radially smaller portion and the radially enlarged portion is defined as a first length. A length of said radially enlarged portion is defined as a second length. A ratio of the first length to the second length is between about 6.5 and about 8.5. A stator assembly, a pump and a method are also disclosed.

4 Claims, 2 Drawing Sheets

WET ROTOR PUMP MOTOR STATOR SEALING LINER

BACKGROUND

This application relates to a sealing liner to be incorporated into a motor for a pump, wherein pump fluid cools the motor.

Pumps are typically driven by electric motors. In one known type of electric motor, pump fluid is allowed to flow across a motor rotor for cooling the motor rotor. The motor rotor is isolated from the motor stator by a sealing liner.

In known motors, a position sensor, which may be known as a resolver, is also incorporated to determine the current position of the motor rotor. This is required to provide feedback to a motor control of the position of the pump which is driven by the motor rotor.

In the prior art, separate sealing liners have been utilized for areas associated with a static portion of the resolver, and a rotating portion of the resolver.

Typically, the resolver has been of a different diameter than the remainder of the motor stator and a portion of the resolver associated with the rotor has also been of a different diameter than the rotor.

SUMMARY

A sealing liner for use in a pump motor incorporates a radially enlarged portion at one end, and a radially smaller portion extending from the one end to an opposed end. A length of the overall sealing liner including the radially smaller portion and the radially enlarged portion is defined as a first length. A length of said radially enlarged portion is defined as a second length. A ratio of the first length to the second length is between approximately 6.5 and approximately 8.5. A stator assembly, a pump and a method are also disclosed.

These and other features of the invention will be better understood from the following specification and drawings, the following of which is a brief description.

DETAILED DESCRIPTION

Figure 1:
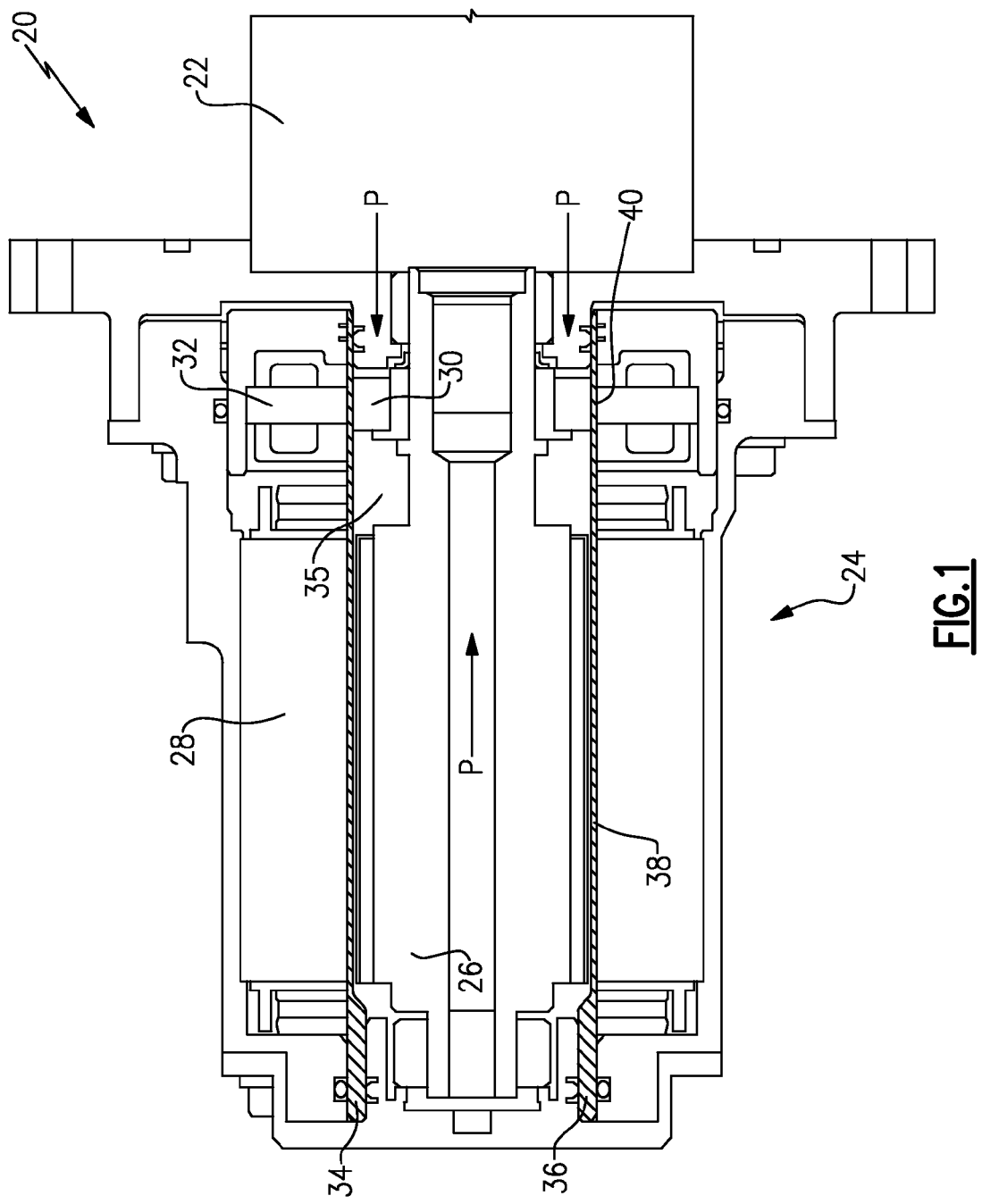
FIG. 1 shows a motor structure including a sealing liner.

FIG. 1 shows a pump assembly 20 having a pump unit 22 which is driven by a motor 24. The motor 24 incorporates a stator 28 driving a rotor 26 in a known manner. As shown schematically at P, pump fluid is allowed to flow across the rotor 26 for cooling. In fact, the actual flow of the pump fluid for cooling purposes may travel along the outside of the rotor 26 from the pump 22 into the motor 24, and then be discharged through the inside of the rotor 26, as generally shown by the arrows P.

A position sensor 32, which may be a resolver, sits adjacent the stator 28. A sensor portion 30 of a position sensor 32 rotates with the rotor 26. A chamber 35 receives the rotor 26 and also receives the pump fluid from the connection P. Sensor 32 senses the position of portion 30, and communicates with a control (not shown).

A sealing liner 34 is generally cylindrical in shape and incorporates a radially enlarged end 36, a rotor portion 38, and a sensing portion 40. The rotor portion 38 and the portion 40 have generally the same diameter, and thus, the part may be extruded. The sealing liner 34 thus extends between the rotor 26 and stator 28, and sensor 32 and sensor rotor portion 30. The sealing liner 34 extends between open ends.

Figure 2:
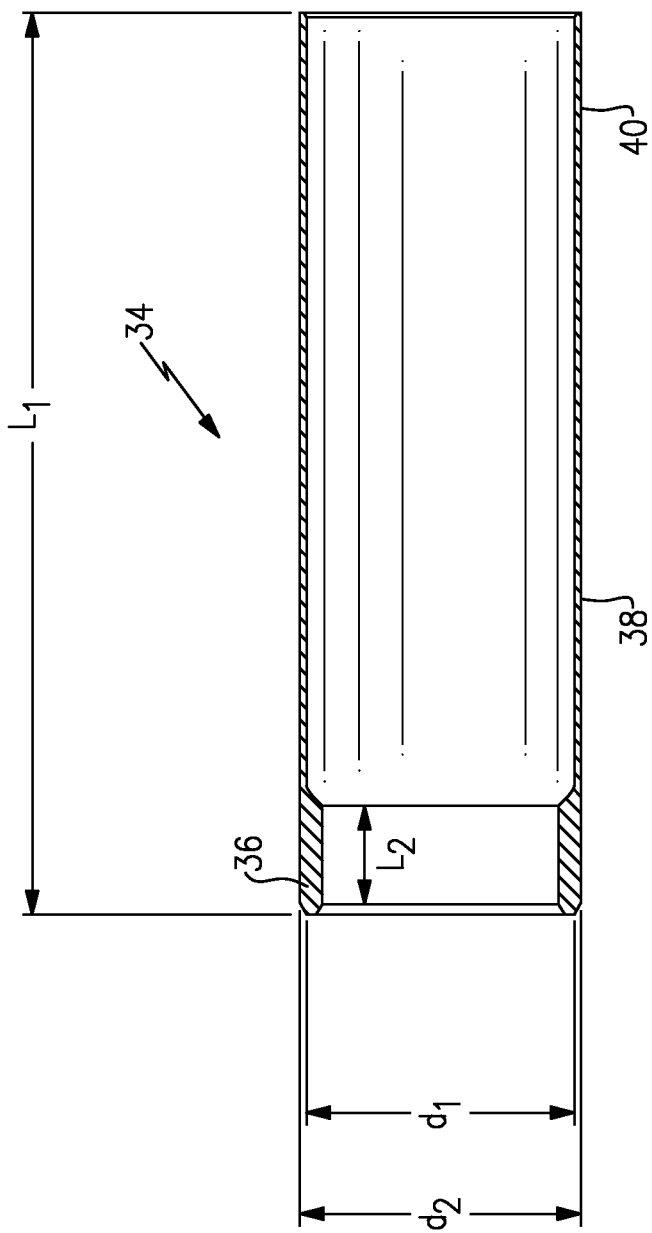
FIG. 2 shows the sealing liner as part of the present invention.

FIG. 2 shows the sealing liner 34 having the radially enlarged portion 36 extending for a length $L_2$. The overall sealing liner 34, including the portions 36, 38, and 40 extends for a length $L_1$.

$L_2$ was about 0.63" (about 1.6 cm) and $L_1$ was about 5.3" (about 13.4 cm) in one embodiment and about 4.1" (about 10.4 cm) in another. In embodiments, a ratio of $L_1$ to $L_2$ is between approximately 6.5 and approximately 8.5.

The inner periphery of the portions 38 and 40 is defined by a dimension or diameter $d_1$, and the outer periphery is defined by a dimension or diameter $d_2$. In one embodiment, $d_1$ may be about 1.58" (about 4 cm) and $d_2$ may be about 1.64" (4.2 cm). A ratio of $d_1$ to $L_1$ may be between approximately 0.4 and approximately 0.33.

The sealing liner 34 may be formed of carbon fiber filled polyetheretherketone (PEEK). However, other suitable materials may be used. Specific examples would include Victrex 450CA30™, or 30% carbon fiber filled PEEK.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A sealing liner for use in a pump motor comprising:
   said sealing liner having a radially enlarged portion at one end, and a radially smaller portion extending from said one end to an opposed end, a length of the sealing liner including the radially smaller portion and the radially enlarged portion being defined as a first length, and a length of said radially enlarged portion being defined as a second length, and a ratio of said first length to said second length being between 6.5 and 8.5;
   said sealing liner being open at each of said one end and said opposed end;
   said sealing liner being stationary, not being able to rotate;
   an inner diameter is defined at said radially smaller portion, and an outer diameter is also defined at said radially smaller portion, with said inner diameter being 1.58 inches, and said outer diameter being 1.64 inches; and
   said outer diameter of said sealing liner being generally constant from said one end to said opposed end.

2. A stator assembly for a motor for driving a pump comprising:
   a stator;
   a position sensor operable to sense a position of an associated portion that rotates with a rotor received within said stator;
   a sealing liner, said sealing liner being positioned radially inward of said stator and said position sensor, said sealing liner having a radially enlarged portion at one end, and a radially smaller portion extending from said one end to an opposed end, a length of the sealing liner including the radially smaller portion and the radially enlarged portion being defined as a first length, and a length of said radially enlarged portion being defined as a second length, and a ratio of said first length to said second length being between 6.5 and 8.5;
   said sealing liner being open at each of said one end and said opposed end;
   said sealing liner being part of a stator assembly;
   an inner diameter is defined at said radially smaller portion, and an outer diameter is also defined at said radially smaller portion, with said inner diameter being 1.58 inches, and said outer diameter being 1.64 inches; and
said outer diameter of said sealing liner being generally constant from said one end to said opposed end.

3. A pump assembly comprising:
a motor driving a pump, said motor including a stator, and a position sensor;
a rotor rotating with a sensor portion;
a passage to communicate fluid from the pump into a chamber surrounding said rotor, and a sealing liner separating said chamber from said stator, said sealing liner being part of a stator assembly;
said sealing liner also separating said position sensor, and said sensor portion, said sealing liner having a radially enlarged portion at one end, and a radially smaller portion extending from said one end to an opposed end, a length of the sealing liner including the radially smaller portion and the radially enlarged portion being defined as a first length, and a length of said radially enlarged portion being defined as a second length, and a ratio of said first length to said second length being between 6.5 and 8.5;
said sealing liner being open at each of said one end and said opposed end;
an inner diameter is defined at said radially smaller portion, and an outer diameter is also defined at said radially smaller portion, with said inner diameter being 1.58 inches, and said outer diameter being 1.64 inches; and
an outer diameter of said sealing liner being generally constant from said one end to said opposed end.

4. A method of replacing a sealing liner in a motor for driving a pump comprising:
inserting a replacement sealing liner into a motor between a motor stator and a motor rotor, the replacement sealing liner being dimensioned such that it extends radially inwardly of both the stator, and a position sensor, and said replacement sealing liner having a radially enlarged portion at one end, and a radially smaller portion extending from said one end to an opposed end a length of the replacement sealing liner including the radially smaller portion and the radially enlarged portion being defined as a first length, and a length of said radially enlarged portion being defined as a second length, and a ratio of said first length to said second length being between 6.5 and about 8.5;
said sealing liner being open at each of said one end and said opposed end;
said sealing liner being part of a stator assembly;
an inner diameter is defined at said radially smaller portion, and an outer diameter is also defined at said radially smaller portion, with said inner diameter being 1.58 inches, and said outer diameter being 1.64 inches; and
said outer diameter of said sealing liner being generally constant from said one end to said opposed end.

* * * * *